(12) United States Patent
Warner (10) Patent No.: US 11,578,472 B2
(45) Date of Patent: Feb. 14, 2023

(54) DREDGING METHOD AND APPARATUS

(71) Applicant: Harwich Haven Authority, Harwich (GB)

(72) Inventor: Jeremy David Warner, Harwich (GB)

(73) Assignee: Harwich Haven Authority, Harwich (GB)

( * ) Notice: Subject to any disclaimer, the term of this patent is extended or adjusted under 35 U.S.C. 154(b) by 0 days.

(21) Appl. No.: 17/430,310

(22) PCT Filed: Oct. 27, 2020

(86) PCT No.: PCT/EP2020/080155
§ 371 (c)(1),
(2) Date: Aug. 11, 2021

(87) PCT Pub. No.: WO2021/099074
PCT Pub. Date: May 27, 2021

(65) Prior Publication Data
US 2022/0267989 A1    Aug. 25, 2022

(30) Foreign Application Priority Data

Nov. 18, 2019  (GB) ........................................ 1916776
May 22, 2020  (GB) ........................................ 2007660

(51) Int. Cl.
*E02F 5/28*    (2006.01)
*E02F 3/88*    (2006.01)
*E02F 3/92*    (2006.01)

(52) U.S. Cl.
CPC .............. *E02F 5/287* (2013.01); *E02F 3/885* (2013.01); *E02F 3/8875* (2013.01); *E02F 3/925* (2013.01); *E02F 3/9218* (2013.01)

(58) Field of Classification Search
CPC ......... E02F 5/287; E02F 3/885; E02F 3/8875; E02F 3/9218; E02F 3/925; E02F 3/88; E02F 3/9206; E02F 3/9243; E02F 3/9293
See application file for complete search history.

(56) References Cited

U.S. PATENT DOCUMENTS

| 3,893,249 A | 7/1975 | Wolters |
| 4,042,279 A | 8/1977 | Asakawa |

(Continued)

FOREIGN PATENT DOCUMENTS

| CN | 105951664 | 9/2016 |
| CN | 206859288 U | 1/2018 |

(Continued)

OTHER PUBLICATIONS

Search Report dated Jan. 20, 2020 in Great Britain Patent Application No. GB1916776.6.

(Continued)

*Primary Examiner* — Jamie L McGowan
(74) *Attorney, Agent, or Firm* — Procopio, Cory, Hargreaves & Savitch LLP (57) ABSTRACT

A method of dredging which comprises suspending dredging apparatus 200 from a vehicle 360. The sediment agitating apparatus comprising a chassis 210, and mounted on the chassis are an extractor, sediment agitating apparatus and respective pumps 220, 230. The dredging apparatus 200 is disposed above, but not in contact with a waterbed 340 to be dredged of sediment 350. The sediment 350 is agitated then extracted with the extractor. The dredging apparatus 200 is moved around the water and the extracted sediment 400 is deposited underwater and above the dredging apparatus 200, so that the sediment 400 is transported and deposited away from an area being dredged by the natural movement of the water. Apparatus and use of the apparatus are also described.

16 Claims, 12 Drawing Sheets

(56) References Cited

U.S. PATENT DOCUMENTS

| | | | | |
|---|---|---|---|---|
| 4,112,695 | A * | 9/1978 | Chang | E02F 5/108 405/163 |
| 4,127,950 | A | 12/1978 | Tillinghast et al. | |
| 4,479,741 | A * | 10/1984 | Berti | E02F 5/105 405/162 |
| 4,611,955 | A * | 9/1986 | Doerr | B01D 21/34 406/115 |
| 4,819,347 | A * | 4/1989 | Lofgren | E02F 5/287 37/344 |
| 4,914,841 | A * | 4/1990 | Weinrib | E02F 3/925 415/58.4 |
| 4,957,392 | A * | 9/1990 | Bailard | E02F 3/8808 405/74 |
| 4,991,997 | A * | 2/1991 | Cowper | E02F 3/9206 405/74 |
| 5,950,732 | A * | 9/1999 | Agee | E02F 3/88 299/8 |
| 5,970,635 | A * | 10/1999 | Wilmoth | E02F 3/925 37/333 |
| 6,178,670 | B1 | 1/2001 | Susman et al. | |
| 6,374,519 | B1 * | 4/2002 | Beaumont | E02F 5/107 37/307 |
| 6,868,625 | B2 | 3/2005 | Jacobsen et al. | |
| 7,754,073 | B2 * | 7/2010 | Nielsen | E02F 3/907 210/242.1 |
| 8,156,666 | B1 * | 4/2012 | Deal, Jr. | E02F 7/026 37/317 |
| 8,522,460 | B2 * | 9/2013 | Stewart | E02F 3/8875 37/344 |
| 9,879,402 | B2 * | 1/2018 | Smith | E02F 3/8866 |
| 10,260,344 | B2 * | 4/2019 | Van Doesburg | E02F 7/065 |
| 2007/0261275 | A1 | 11/2007 | Tack | |
| 2012/0216435 | A1 | 8/2012 | Wen | |
| 2013/0340298 | A1 | 12/2013 | Phillips | |
| 2014/0238924 | A1 | 8/2014 | Niizato et al. | |

FOREIGN PATENT DOCUMENTS

| | | |
|---|---|---|
| DE | 3704003 | 8/1988 |
| DE | 3923113 | 1/1991 |
| DE | 4110781 | 3/1997 |
| DE | 102017119981 | 2/2019 |
| EP | 0091264 | 10/1983 |
| EP | 1597439 | 11/2005 |
| EP | 1584754 | 11/2007 |
| EP | 1639206 | 5/2010 |
| EP | 2543774 | 1/2013 |
| EP | 1951396 | 4/2015 |
| EP | 2966227 | 1/2016 |
| EP | 2644781 | 6/2016 |
| EP | 2626473 | 12/2016 |
| FR | 2860532 | 4/2005 |
| GB | 1408393 | 10/1975 |
| GB | 1470308 | 4/1977 |
| GB | 2459700 | 11/2009 |
| GB | 2543764 | 5/2017 |
| GB | 2586550 | 2/2021 |
| JP | H05214741 | 8/1993 |
| WO | 2018031028 | 2/2018 |

OTHER PUBLICATIONS

Search Report dated Jul. 9, 2020 in Great Britain Patent Application No. GB2007660.0.

Combined Examination and Search Report dated Nov. 24, 2020 in Great Britain Application No. GB2017208.6.

Examination Report dated Jun. 15, 2021 in Great Britain Application No. GB2017208.6.

Intent to Grant dated Jul. 1, 2021 in Great Britain Application No. GB2017208.6.

Search Report conducted by IP Australia on behalf of Tonga dated Apr. 20, 2021 and assigned Application No. TO/P/20/00043.

International Search Report and Written Opinion dated Mar. 4, 2021 in PCT Application No. PCT/EP2020/080155.

Name Search and Silver Freedom to Operate Search Report dated Apr. 9, 2021.

Name Search and Silver Freedom to Operate Search Report dated May 27, 2021.

* cited by examiner

DREDGING METHOD AND APPARATUS

CROSS REFERENCE TO RELATED APPLICATIONS

This application is a U.S. national stage entry under 35 U.S.C. § 371 of International Application No. PCT/EP2020/080155 filed Oct. 27, 2020, entitled "DREDGING METHOD AND APPARATUS," which claims priority to, and the benefit of, Great Britain Patent Application Serial No. 2007660.0, filed on May 22, 2020 and Great Britain Patent Application Serial No. 1916776.6, filed on Nov. 18, 2019. Each of the foregoing applications are hereby incorporated by reference in their entirety (except for any subject matter disclaimers or disavowals, and except to the extent of any conflict with the disclosure of the present application, in which case the disclosure of the present application shall control).

This invention relates to a method of dredging, dredging apparatus, and the use of dredging apparatus.

Dredging is generally defined as the underwater removal of sediment and its transport from one place to another. Dredging is a process which may comprise the steps of bringing sediment up from the surface of the waterbed, and optionally the steps of transporting the sediment away from the area being dredged, and then finally disposal of the sediment. Optionally, the sediment may be loosened in the first instance.

Dredging can be undertaken for a number of different reasons, for example, clearing a harbour or waterway where sediment has built up which could potentially become an obstruction to shipping. Since harbours are generally deeper than the surrounding area of water, sediment can build up and not be washed away by the natural flow of the water, for example, by tidal waters or the flow of a river.

Examples of prior art methods of dredging include a surface mounted grab or backhoe which can be used to physically lift sediment in a bucket, whereby the sediment is then placed into a hopper for subsequent disposal. A further prior art method utilises a trailing suction hopper dredger, which comprises a ship connected to a trailing drag head, wherein the sediment is pumped from the waterbed through the drag head to a hopper on the ship.

Further prior art methods of dredging include the use of water injectors which inject water into the sediment to loosen it and reduce the density of the sediment, causing it to be suspended above the waterbed in a so-called "density cloud". The suspended sediment is then washed away by gravity action. This method finds particular utility in rivers and tidal areas where the resulting density cloud of sediment can flow under gravity to deeper areas.

A further method of dredging uses cutter suction dredgers which comprise a rotating cutter head mounted in front of a suction head, where the cutter head rotates along the axis of the suction pipe. The cut sediment is then sucked in by a suction pump. Such cutter suction dredgers are intended to be used in a stationary position—even if mounted on a ship, the ship will be moored with spud legs or anchors during use.

A further prior art method that is employed to deal with the issue of sediment in a shipping channel or harbour is seabed levelling, whereby a plough is towed behind a vehicle to flatten raised areas of sediment without actually removing any of the sediment from the waterbed.

Various attempts have also been made to provide dredgers that operate on the bottom on the waterbed and disturb sediment with cutters or high-pressure fluid jets. These vehicles may be autonomous vehicles (such as that described in GB 2543764 A) or may be dragged along the waterbed by a vehicle, such as that described in US2014/0238924 A1. Vehicles that operate on the waterbed create a seal between the underside of the dredger and the waterbed and use negative pressure to draw in and expel the sediment.

Alternative prior art dredgers operate above the waterbed. For example, U.S. Pat. No. 4,127,950 describes a suction head that draws liquid-agitated sediment into a vertically-disposed housing, after which separate gas jets force the sediment out of the housing. Such dredgers are cumbersome and slow moving, due to the necessarily-solid, closed housing creating a lot of drag. Such dredgers also require compressed fluid for the gas and liquid injector to be pumped from a surface vessel.

There are various problems associated with the prior art dredging methods. For example, water injection dredging requires that the water is flowing due to gravity in order to clear the suspended sediment, so is of little use in a coastal harbour where there is no gradient. Seabed levelling does not remove any of the sediment, it merely flattens it, and the sediment can continue to build up over time. Trailing suction hopper dredgers, whilst often effective at clearing sediment, require purpose built and expensive equipment including a bespoke ship with a large hopper. Such equipment is not only expensive to acquire, but also to operate. Dredging with a grab arm and/or backhoe is also expensive as it requires the use of a specially adapted ship with a hopper to take away the dredged sediment.

Dredgers that are disposed on the waterbed are problematic in that the waterbed of a harbour, for example, is rarely flat and will contain lots of solid debris, making such dredgers impractical and easily damaged. Debris often encountered on the waterbed of a harbour includes container lashings, which comprise long metal poles which fall from containers as they are being loaded and unloaded. The container lashings can cause considerable damage to a dredger, and considerable time is then spent having to repair the dredger before it can be re-used, which has significant cost implications.

The present invention addresses the problems associated with the prior art by providing apparatus and methods that are not only efficient at removing sediment from a range of different waterbeds, but it also relatively inexpensive to operate.

According to the present invention there is provided a method of dredging comprising: suspending dredging apparatus from a vehicle, the dredging apparatus comprising: a chassis; sediment agitating apparatus for disposal above a sediment layer on a waterbed, the sediment agitating apparatus comprising a fluid injector and a pump arranged to inject fluid through the fluid injector, the sediment agitating apparatus and pump being mounted on the chassis; an extractor, the extractor being arranged to move agitated sediment away from the waterbed and above the dredging apparatus, the extractor comprising a conduit and a pump arranged to pump agitated sediment through the conduit, the extractor and pump being mounted on the chassis; and a connector for connecting the sediment dredging apparatus to the vehicle; disposing the dredging apparatus above, but not in contact with a waterbed to be dredged of sediment; agitating the sediment with the sediment agitating apparatus; extracting the sediment with the extractor; depositing the extracted sediment underwater and above the sediment agitating apparatus; and moving the dredging apparatus around the water; wherein the sediment is transported and deposited away from an area being dredged by the natural movement of the water.

The method according to the present invention works by raising agitated sediment to a higher water column whereby the natural movement of the water is able to wash the suspended sediment away. In a harbour, this may mean raising the sediment to a level higher than that of the sea floor outside of the harbour, so that the tidal waters remove the sediment.

By having the dredging apparatus operate above the level of the waterbed, the dredger is able to mitigate the problems associated with many prior art devices by avoiding much of the debris and being able to traverse uneven waterbeds.

The sediment being extracted may be lightweight and loose, and in which case the action of the extractor alone may be sufficient to draw the sediment into the dredging apparatus to extract it, without having to engage the sediment agitating apparatus. However, if the sediment is heavy, compacted or otherwise not agitated, the sediment agitating apparatus may be engaged.

The sediment dredging apparatus may employ a range of different sediment agitating means in addition to a fluid injector. The fluid injector further comprises a pump, wherein the pump injects fluid through the fluid injector into the sediment to loosen the sediment prior to extraction. The fluid injector and pump are mounted to the chassis. The fluid injector may be provided on the underside of the sediment agitating apparatus. In particular, the injector may comprise an outlet positioned so as to expel fluid in a downward direction during use into the sediment disposed on the waterbed. More than one fluid injector may be provided, and an array of fluid injectors may be provided. The fluid injector may comprise one or more conduit, the conduit bearing a plurality of outlets or nozzles. The outlets may be spaced evenly along the conduit. A plurality of conduits may be provided in a parallel arrangement along the width of the chassis. The one or more conduit may span the entire width of the chassis. A plurality of pumps may be provided, with one pump provider per fluid injector or with a plurality of fluid injectors. The fluid being injected may be water or air or a combination thereof. If the fluid is water, then preferably the fluid injector will further comprise an inlet, and in use water will be drawn from the water surrounding the dredging apparatus. Alternatively, the fluid may be provided from the surface or from the vehicle to the dredging apparatus.

Prior art dredgers that pump fluid to agitate sediment will generally use high pressure jets. High pressure in the art is defined as 800-1000 kPa (8-10 bar). Conversely, the fluid injected by the dredgers according to the present application is injected at low pressure (150-200 kPa/1.5 to 2 bar) or medium pressure (400-500 kPa/4-5 bar). Low to medium pressure has been found to be advantageous over high pressure jets, as it requires fewer resources in terms of pump pressure and power use and is effective at agitating sufficient amounts of sediment.

The dredging apparatus comprises a chassis supporting the sediment agitating apparatus and extractor. The present dredging apparatus in use operates above and apart from the waterbed, however the chassis may be suitably robust in order to withstand contact with the waterbed. This may occur when the dredging apparatus is being lowered into place, if the waterbed is uneven, or if the vehicle is a boat and the water on which the boat is floating is undulating.

The chassis may comprise shock absorbing means to protect the dredging apparatus if it collides with the waterbed and/or debris which it may encounter during use. For example, the chassis may be provided with buffers mounted on the underside of the chassis, or alternatively may comprise heavy-duty runners to protect the underside of the chassis.

The chassis may have a generally planar, solid base, or alternatively may be in the form of an open frame, preferably with an open base. The frame may be formed of metal or plastic tubing or the like. The chassis may comprise side walls, an upper surface on which items such as the extractor and sediment agitating apparatus are provided. The front and back of the frame may be "open" which will allow for heavy material and debris, which otherwise would damage the dredging apparatus, to pass through the dredging apparatus. Furthermore, having an open frame will reduce the drag on the chassis as it moves through the water, thereby allowing for a dredging operation to proceed at a faster rate than would be possible with prior art dredgers.

The chassis comprises opposed side panels, and one or more body panel disposed in parallel between the side panels and joined by one or more cross member.

The one or more cross member may comprise the sediment agitating apparatus, and wherein the sediment agitating apparatus comprises one or more conduit comprising one or more outlet for injecting fluid, the sediment agitating apparatus being in communication with the one or more pump, which pump is in communication with an inlet, and wherein fluid is drawn in from the surrounding area through the inlet.

In addition or alternatively, the one or more cross member may comprise the extractor, wherein the extractor comprises one or more conduit comprising inlets into which agitated sediment is drawn to be expelled, wherein the extractor is in communication with the one or more pump, which pump is in communication with a conduit raised above the dredging apparatus to expel agitated sediment above the dredging apparatus in use.

The one or more cross member may also comprise a rigid support bar. The rigid support bar may comprise a tapered leading edge so cut through any sediment encountered during use.

The chassis may comprise runners connected to the underside of the body and/or side panels. A leading edge of the body and side panels may be rounded so as to deflect debris.

The dredging apparatus may be provided at a leading end, or front, thereof with a pilot to deflect debris encountered on the waterbed. The pilot could be a solid scoop to deflect debris either above or below and/or to the side of the dredging apparatus. The pilot may be in the form of an angled grille comprising bars to allow water to pass therethrough to ensure that the grille does not produce too much drag, but which prevents ingress of debris. The grilles may be sized appropriately so that debris such as container lashings cannot enter the dredging apparatus, even end-on, but without causing too much drag in the water. A pilot may also be disposed on the upper surface of the dredging apparatus to protect the top of the dredging apparatus, even if not provided on the front of the dredging apparatus. The pilot may comprise angled solid plates. The angled solid plates may be disposed in front of the injector pumps.

If the chassis is open, the rear end thereof may be provided with biased flaps, which may be deformable mats made from rubber, plastic or the like, to keep agitated sediment inside or beneath the chassis to be expelled, but which will deflect it they encounter a solid object or under a threshold of pressure.

The dredging apparatus may further comprise a swell compensator disposed on the vehicle, the swell compensator maintaining the dredging apparatus at the same level above the waterbed.

The extractor comprises a conduit and a pump arranged to pump the agitated sediment through the conduit. The conduit may have a first opening exposed to the underside of the sediment dredging apparatus, and a second opening disposed at a highermost point on the sediment dredging apparatus when deployed in use. This arrangement ensures that the first opening is directed towards the agitated sediment and the second opening is raised at a particular level whereby ejected sediment can be washed away by the natural movement of the water during use. The size and shape of the conduit, therefore, will depend on the intended use. For example, a longer conduit may be provided on dredging apparatus intended for use in a relatively deep harbour which is significantly deeper than the surrounding sea floor, wherein the sediment will need to be deposited at a relatively higher level in order that the tide can wash out the suspended sediment. Whereas, if the apparatus is to be used in shallower waters, such as a canal or river based harbour, then the conduit will need to be relatively shorter.

The relative height of the conduit could also be adjustable. The conduit could be replaceable with conduits of different lengths or the conduit length could be adjustable. A conduit could telescope or have modular extensions that can be removably attached. The angle of the conduit relative to the dredging apparatus could also be adjustable so that the relative height of the conduit above the dredging apparatus is adjusted.

The shape of the conduit can also be varied so that, for example, a wider second opening may distribute extracted sediment more widely than were the second opening to be narrower. The conduit therefore may be frustoconical, where the second opening is wider than the first opening, or the second opening may be fluted. The second opening may be bifurcated into two openings.

The pumps may be provided with a power supply. Said power supply could be provided on the chassis or could be provided on an above-surface vehicle. Power packs may be provided with the dredging apparatus, which can be retrofitted on to an existing vehicle, or a vehicle could be adapted to include an auxiliary power unit to provide power to the pump or pumps. Power could be provided to the pumps via a cable from the surface. Power could be provided in the form of electricity or hydraulic pressure.

The apparatus according to the present invention may be towed across the waterbed by a vehicle such as a boat. However, in certain situations the vehicle could also be a land-based vehicle for instance if the water being dredged is a canal. The sediment dredging apparatus is therefore provided with a connector for connecting the sediment dredging apparatus to a vehicle. The dredging apparatus may also include a winch which can be retrofitted to a vehicle to raise and lower the dredging apparatus in the water. In some embodiments, the dredging apparatus could be provided with its own propulsion means.

The present invention also provides dredging apparatus for disposal above, but not in contact with, a waterbed to be dredged of sediment, the apparatus comprising: a chassis; sediment agitating apparatus for disposal above a sediment layer on a waterbed, the sediment agitating apparatus comprising a fluid injector and a pump arranged to inject fluid through the fluid injector, the sediment agitating apparatus and pump being mounted on the chassis; an extractor, the extractor being arranged to move agitated sediment away from the waterbed and above the dredging apparatus, the extractor comprising a conduit and a pump arranged to pump agitated sediment through the conduit, the extractor and pump being mounted on the chassis; and a connector for connecting the sediment dredging apparatus to a vehicle.

The dredging apparatus may be as described in relation to the method of the present invention.

The present invention also provides use of dredging apparatus as herein described, wherein the use comprises: suspending the dredging apparatus above, but not in contact with a waterbed to be dredged, extracting the agitated sediment with the extractor, and depositing the extracted sediment underwater and above the dredging apparatus.

So that it may be better understood, the present invention will now be described in detail by way of example only, with reference to the following figures, in which.

Figure 1:
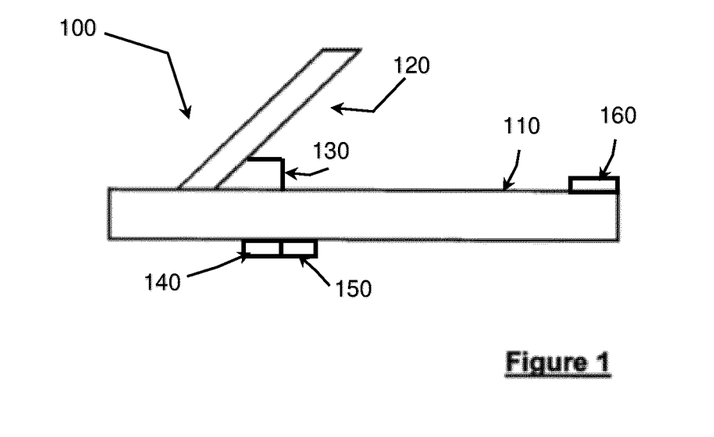
FIG. 1 shows a schematic representation of dredging apparatus according to the present invention.

With reference initially to FIG. 1 there is shown a schematic representation of dredging apparatus generally indicated 100, for use in the method according to the present invention. The dredging apparatus 100 comprises a chassis generally indicated 110 and an extractor comprising a conduit generally indicated 120 and a pump 130, sediment agitating apparatus generally indicated 140 and a pump 150, and a connector 160 for connecting the dredging apparatus to 100 a vehicle. The dredging apparatus is for disposal above and not in contact with a waterbed on which there is sediment that needs to be removed. The sediment is then removed by the extractor above the dredging apparatus 100 and into a higher water column. Once extracted by the extractor, the agitated sediment is then washed away by the natural movement of the water, such as the movement of the tides or flow of a river.

Figure 2A:
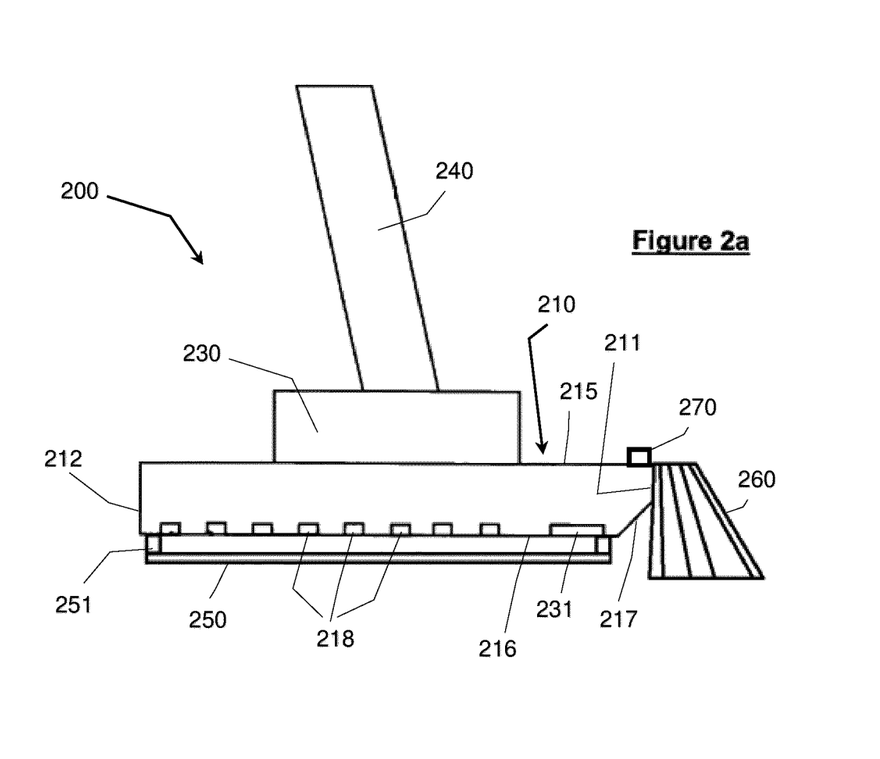
FIG. 2*a* shows a schematic cross-sectional end view of an alternative dredging apparatus.
Figure 2B:
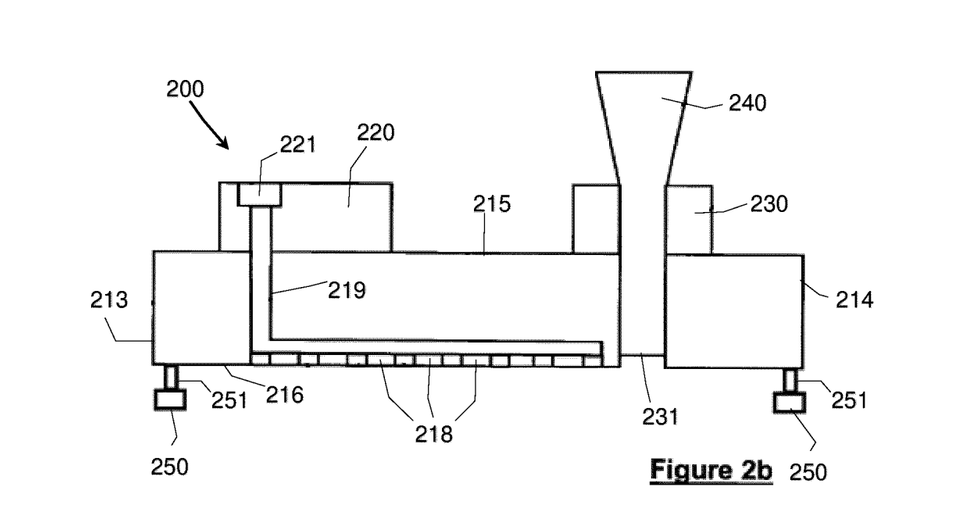
FIG. 2*b* shows a schematic cross-sectional side view of the dredging apparatus of FIG. 2*a*.
Figure 2C:
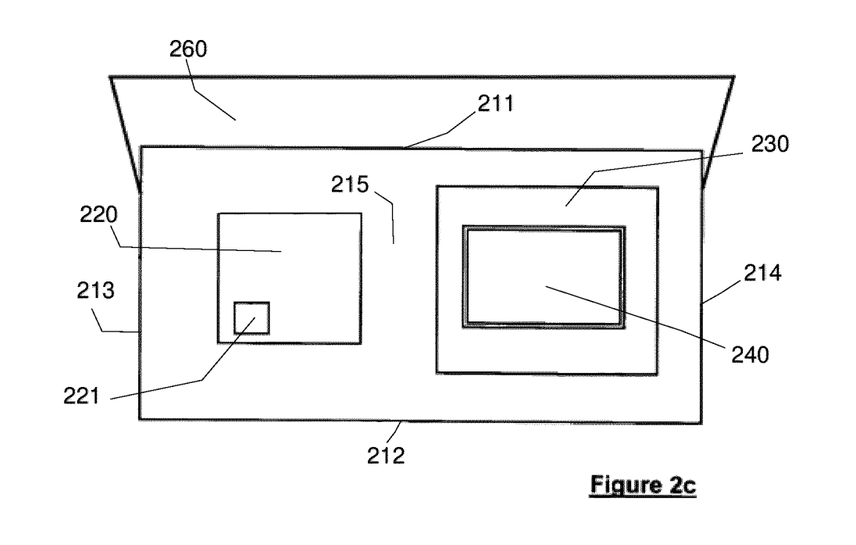
FIG. 2*c* shows a schematic plan view of the dredging apparatus of FIGS. 2*a* and 2*b*.

Referring now to FIGS. 2*a* to 2*c*, there is shown an alternative embodiment of dredging apparatus generally indicated 200. The dredging apparatus 200 comprises a chassis, generally indicated 210. The chassis 210 has a generally rectangular footprint, as shown in FIG. 2*c*. The chassis 210 comprises leading long face 211, trailing long face 212, side faces 213, 214, upper surface 215 and underside 216. As shown most clearly in FIG. 2a, the corner junction of leading long edge 211 and the underside 216 is chamfered to produce angled face 217 so as to raise leading edge 211 above the underside 216.

Mounted on upper surface 215 is injector pump 220. Injector pump 220 is in fluidic communication with an array of fluid injectors, generally indicated 218, arranged to inject fluid beneath underside 216. The fluid injectors are arranged along the length of the chassis 210 between the side faces 213, 214 and are provided to inject fluid into the sediment in use to agitate it. The fluid injectors 218 may be arranged in a line adject the angled face 217. The chassis 210 is substantially hollow and includes a conduit 219 from an injector pump 220 to the fluid injectors 218. The injector pump 220 further includes an inlet 221 to draw water from the surrounding area during use before it is pumped through the fluid injectors 218. In this case, the fluid is water but in alternative embodiments could be air or an air and water mix. The fluid, particularly if it comprises air, could be pumped from the surface.

Mounted on chassis 210 is an extractor pump, generally indicated 230. Extractor pump 230 includes an inlet 231 to draw water and agitated sediment from the surrounding area during use, where it is then pumped out via an outlet comprising a conduit generally indicated 240. Conduit 240 comprises a generally frustoconical chimney, though could alternatively be substantially cylindrical or have a fluted or bifurcated distal end to more broadly distribute sediment. Fluid drawn in through the inlet 231 of extractor pump 230 is expelled by conduit 240. Although not shown, injector pump 220 and extractor pump 230 are provided with power from a power source, which could either be mounted on the apparatus 200, or provided via a cable from the surface.

The injector pump 220 and extractor pump 230 may be releasably-attachable to the chassis 210. The pumps are in use quite likely to be damaged by underwater debris, such as container lashings, and therefore if they are releasably-attachable they may be replaced if damaged beyond repair during a dredging operation. Therefore, down-time can be mitigated.

Runners 250 are disposed in parallel along the side edges of the underside 216 of the chassis 210. The runners 250 are attached to the underside 216 of the chassis 210 with stanchions 251, which include shock absorbers (not shown). The runners 250 and shock absorbers protect the chassis 210 if the chassis 210 inadvertently contacts the waterbed during use. Alternatively, the stanchions may be solid and not comprise shock absorbers.

A pilot 260 is attached to the leading long face 211 to deflect debris that might be encountered by the dredging apparatus as it is towed through the water during use.

A connector 270 is provided toward the leading edge of the chassis 210 for connection of the dredging apparatus 200 to a vehicle.

Figure 3:
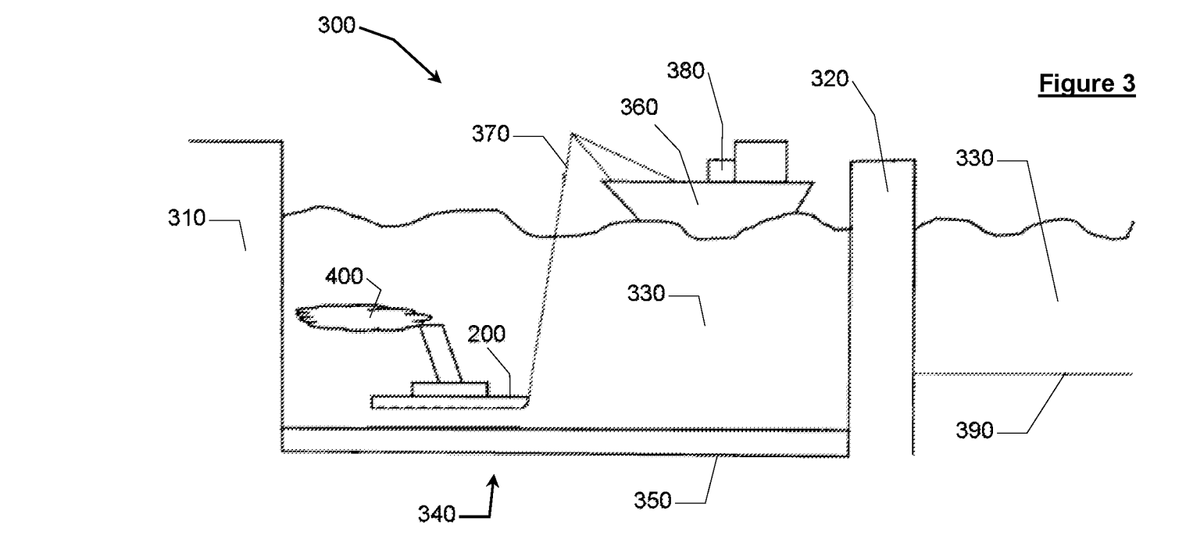
FIG. 3 shows a schematic view of a harbour and an embodiment of dredging apparatus in use.
Figure 4:
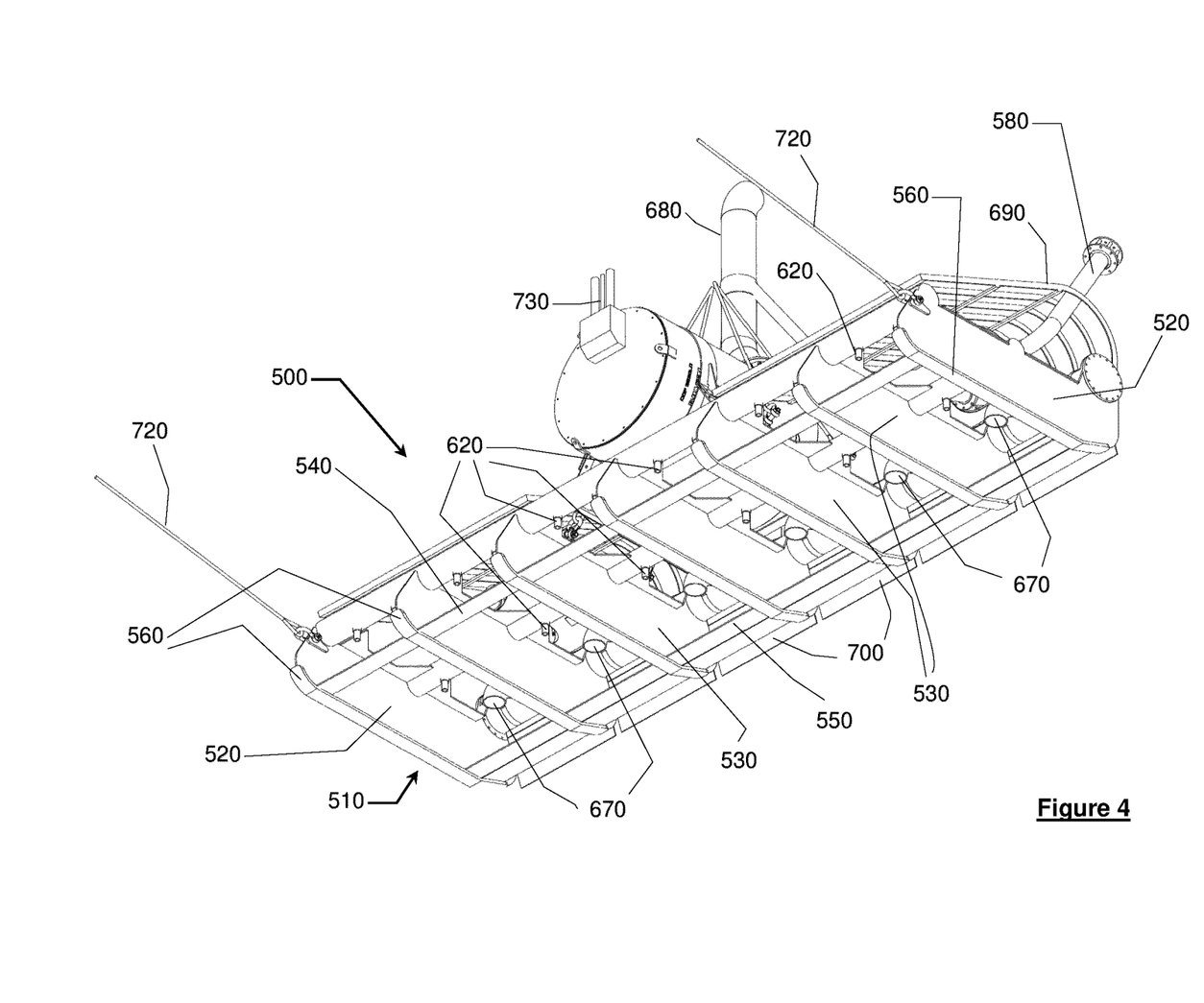
FIG. 4 shows a front, top perspective view of an alternative dredging apparatus according to the present invention.
Figure 5:
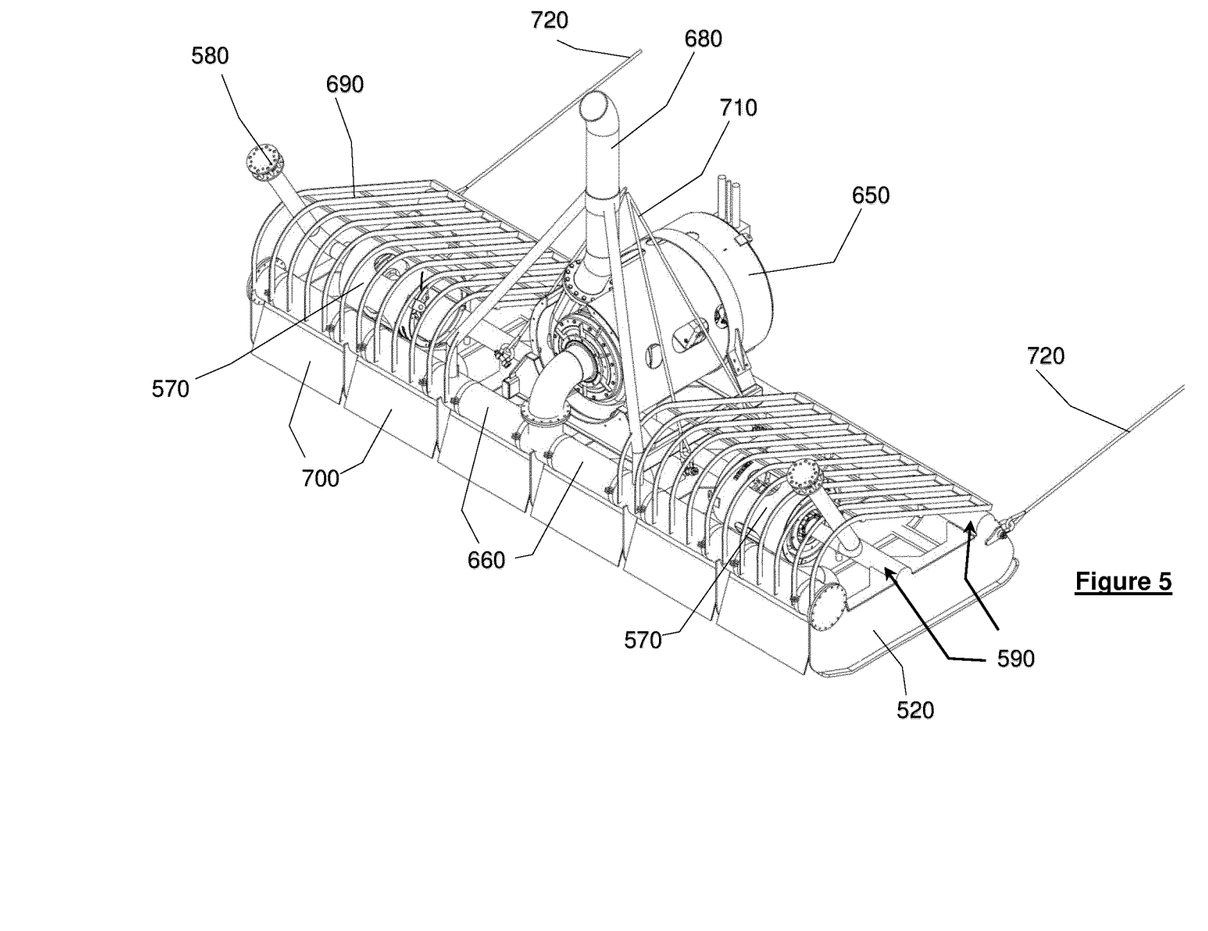
FIG. 5 shows a rear, top perspective view of the dredging apparatus of FIG. 4.
Figure 6:
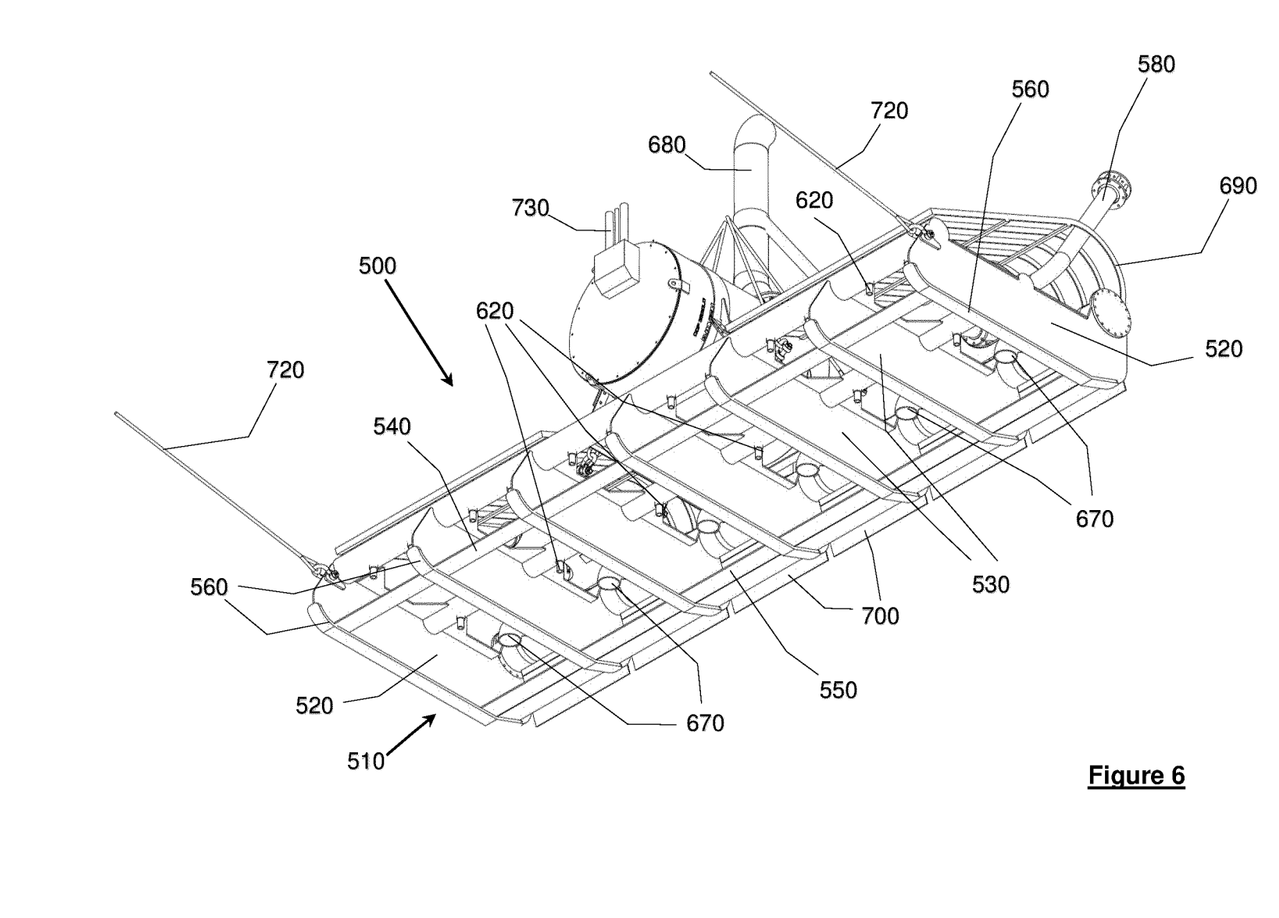
FIG. 6 shows an underside perspective view of the dredging apparatus according to FIGS. 4 and 5.
Figure 7:
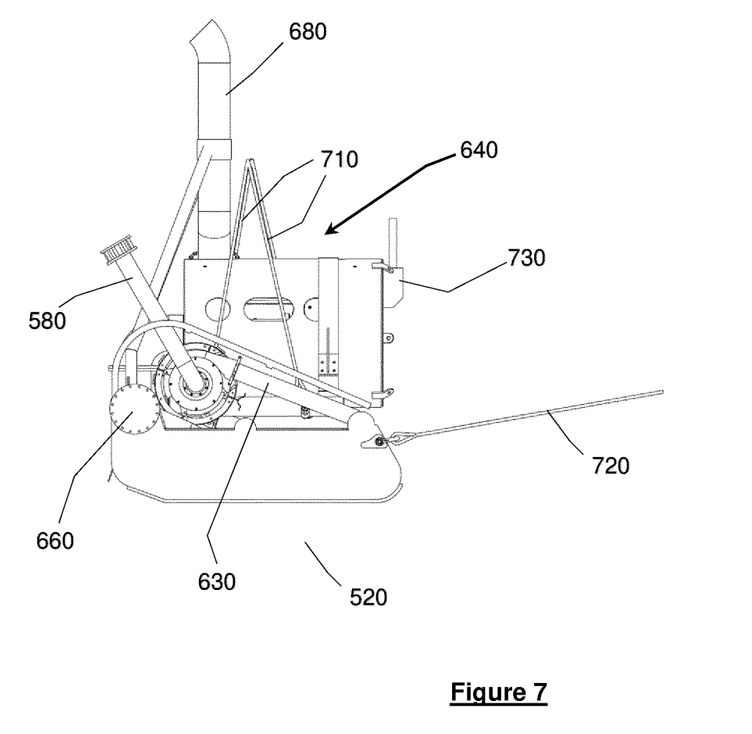
FIG. 7 shows a side view of the dredging apparatus according to FIGS. 4 to 6.
Figure 8:
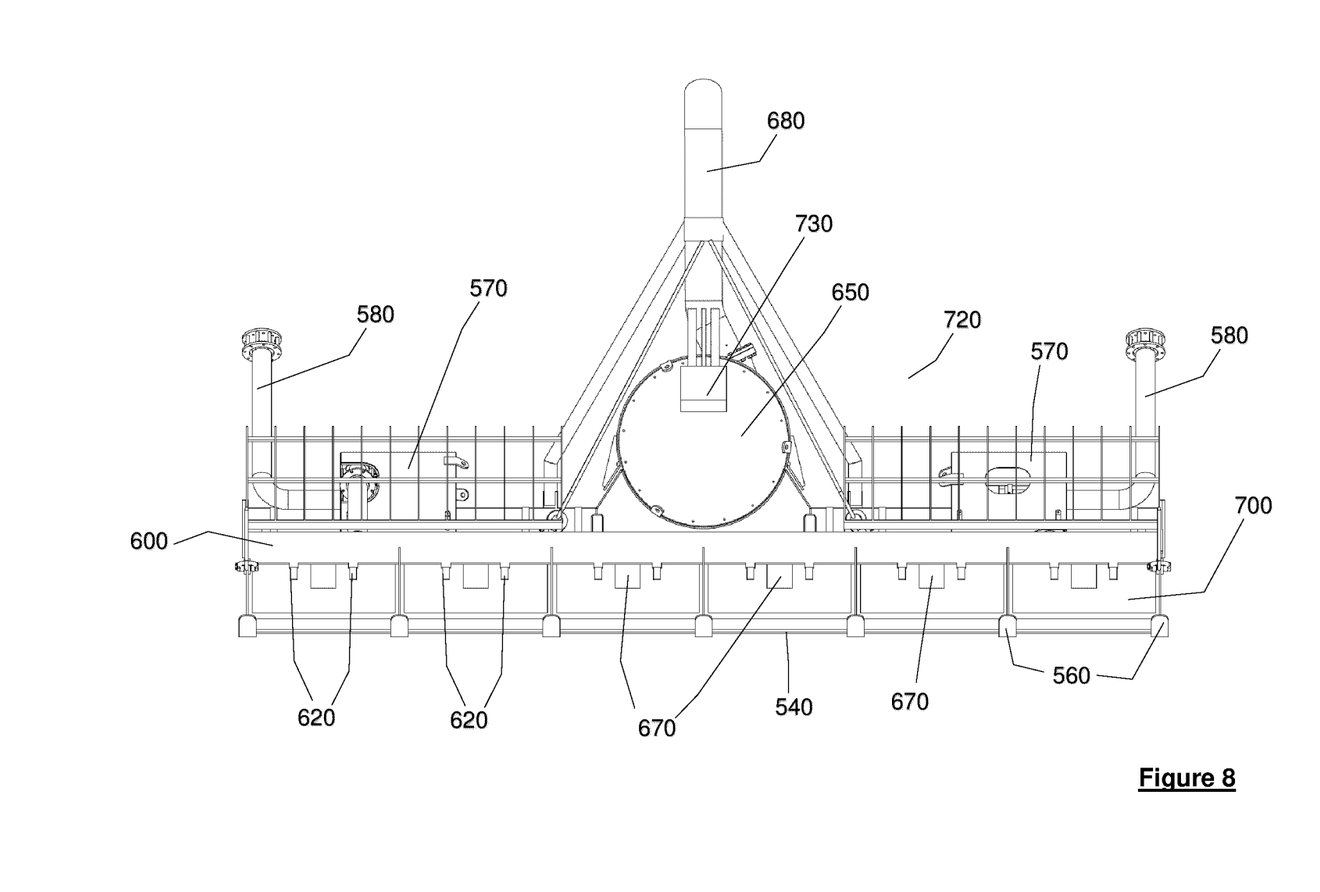
FIG. 8 shows a front view of the dredging apparatus according to FIGS. 4 to 7.
Figure 9:
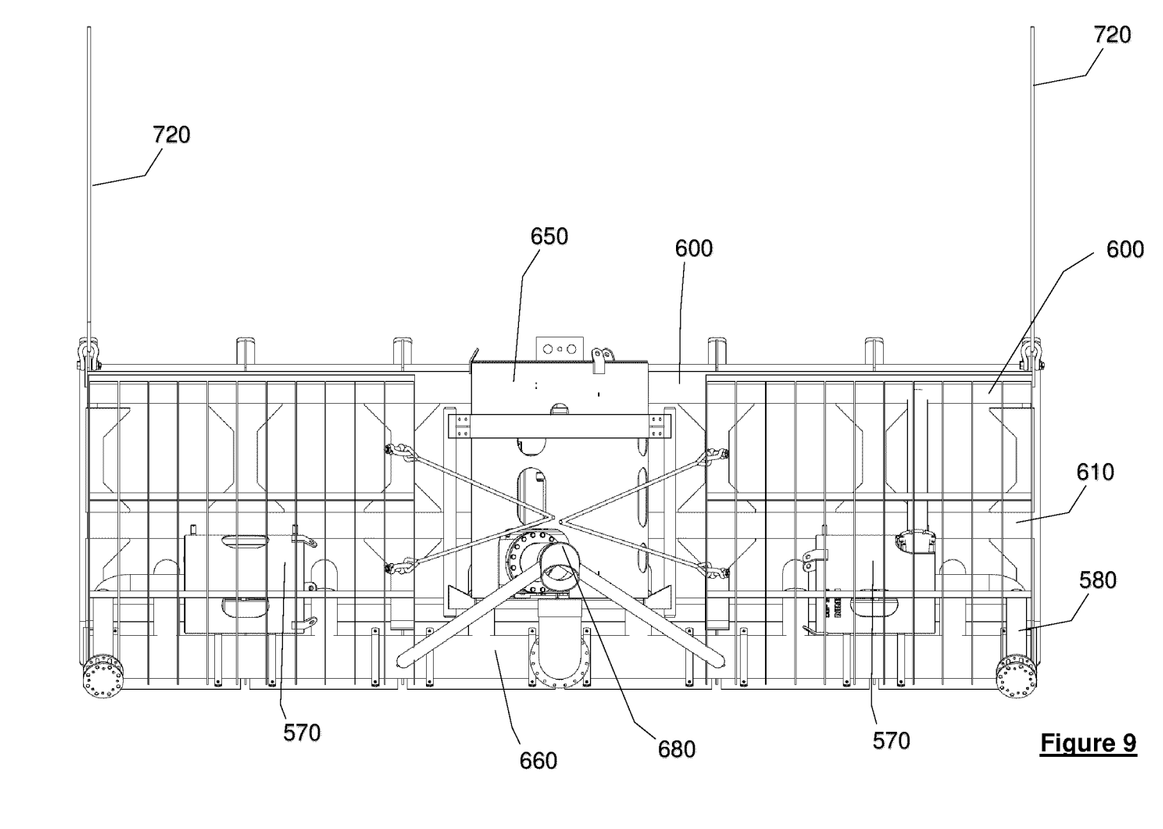
FIG. 9 shows a top view of the dredging apparatus according to FIGS. 4 to 8.

Turning now to FIG. 3 there is shown a schematic side view of a harbour, generally indicated 300, comprising land generally indicated 310, and a harbour wall generally indicated 320 housing sea water generally indicated 330. The harbour floor 340 has disposed above it a built-up sediment layer 350 which is to be dredged. On the other side of the harbour wall 320 is the open sea and as shown in FIG. 3, the sea floor 390 is relatively higher than the floor of the harbour 340. Tidal waters are able to enter and leave the harbour, however due to the relative difference of height of the harbour floor 340 and the sea floor 390, the sediment 350 at the bottom of the harbour floor 340 cannot wash away, even if it is agitated.

The dredging apparatus 200, as described in relation to FIGS. 2a to 2c, is provided above, but not in contact with, the sediment layer 350. The sediment dredging apparatus 200 is towed above the harbour floor 340 and above the sediment layer 350 by a boat 360 on the surface of the water 330. The boat comprises a winch and cable 370 which is attached to the connector 270 of the dredging apparatus 200 not only for raising and lowering the dredging apparatus 200 out of the water but also for towing the dredging apparatus 200 along the sediment later 350. In this embodiment a power pack 380 is provided on the surface of boat 360 to provide power to the pumps 220 and 230 disposed on apparatus 200, although in alternative embodiments the boat may be provided with an auxiliary power unit which may directly power the pumps 220 and 230.

In use, the sediment dredging apparatus 200 is lowered from the boat on to the sediment later 350 disposed above the harbour floor 340 via the winch 370. The injector pump 220 is operated via a control (not shown) and the power source 380 and pumps water 330 through the inlet 221 from the harbour 300 into the conduit 219 in the chassis 210, and out through the fluid injectors 218 in the underside 216 of the chassis 220 to agitate the sediment 350. The injection of water into the sediment layer 350 causes a reduction in the density of the sediment as well as causing it to be loosened from the settled sediment 350. The extractor pump 230 then draws in the loosened sediment 340 through inlet 231 and expels the sediment as shown in cloud 400 at a level that is higher than the level of the sea floor 390. Because the agitated sediment 400 is in a higher water column than the sea floor 390, tidal water 330 entering and leaving the harbour 300 is then able to extract the ejected layer of sediment 400 and deposit it away from the harbour.

Turning now to FIGS. 4 to 9 there is shown an alternative embodiment of dredging apparatus generally indicated 500. This dredging apparatus 500 may be used in the method of the present invention and as described in respect of FIG. 3. The dredging apparatus 500 comprises a chassis comprising a frame generally indicated 510. The frame 510 comprises a series of body components provided in a parallel arrangement, supported by cross members. Advantageously, the frame is rugged and can withstand contact with the waterbed and with underwater debris. Furthermore, the "open" nature of the frame reduces drag in the water.

The body components of the frame 510 comprise opposed side walls 520 and body panels 530. The body panels 530 are disposed equidistantly between the opposed side walls 520 and are substantially the same shape as the opposed side walls 520. The side walls 520 and body panels 530 are joined by a cross member 540 disposed underneath and towards the front of the side walls 520 and body panels 530, and a further cross member 550 disposed underneath and at the rear of the side walls 520 and body panels 530. The underside of the body panels 530 and the opposed side walls 520 comprise runners generally indicated 560. The runners 560 are provided to protect the frame 510 were it to encounter the waterbed during use.

The dredging apparatus 500 is provided with a fluid injector to inject fluid into the sediment on the waterbed in order to agitate and/or dilute it. The injector comprises a pair of injector pumps generally indicated 570 which are disposed at equal positions on either side of the frame 510, the injector pumps 570 including inlets generally indicated 580 in the form of conduits extending from the injector pumps 570 and raised above the level of the frame 510 so as to draw water from the surrounding area to inject into the sediment. The inlets 580 are raised above the frame 510 so as to not draw in sediment which has been ejected by the dredging apparatus 500. The injectors further comprise a pair of fluid outlets generally indicated 590. The fluid outlets 590 comprise a pair of parallel pipes 600, 610 extending between the top front corners of the opposed side walls 520 and between the middle of the top edge of the opposed side walls 520. The body panels 530 are also joined to the parallel pipes 600 and 610. Each pipe 600, 610 comprises a series of downwardly pointing nozzles 620 through which fluid is injected into the sediment during use. Two nozzles 620 are provided between each side wall 520 and/or body panel 530, though this number may be increased or decreased accordingly. Each of the parallel pipes 600 and 610 is in fluidic communication with the injector pump 570 via conduits generally indicated 630.

The dredging apparatus 500 further comprises an extractor generally indicated 640 which comprises an extraction pump 650 which draws, during use, agitated sediment from the underside of the frame 510 and deposits it in a water column above that of the dredging apparatus 500. The extractor 640 further comprises extractor pipe 660 which is disposed between the side walls 520 at a top rear corner thereof, thus providing further support to frame 510 and extractor pipe 660 is connected also to the equidistantly spaced body panels 530. The extractor pipe 660 comprises a series of downwardly facing openings 670 into which the agitated sediment is drawn during use. Extending from the extractor pump 650 is extraction conduit 680 which extends higher than the inlets 580 of the injector. The extractor pump 650 and conduits 680 are securely attached to the frame 510. During use, agitated sediment is pumped up into the openings 670 disposed on the extractor pipe 660, drawn to the extraction pump 650, and then expelled thorough the extraction conduit 680.

The frame 510 and the injector pumps 570 are protected from underwater debris by a pilot in the form of grilles 690 which are hingedly mounted to the upper rear of the frame 510 and which are provided in a wedge shape to deflect debris encountered in the water above the frame 510. The front edge of the opposed side walls 520 and the body panels 530 are also rounded in order to deflect debris either above or below the frame 510. The grilles 690 are hingedly mounted so that the injector pumps and pipework can be serviced.

Extending from the rear of the frame 510 are disposed between each body panel 530 and side wall 520 are resiliently deformable mats 700, which may be made from rubber, plastic or the like. The mats 700 extend down from the top of the frame 510, where they are connected to the frame, and down to the bottom of the frame 510, and thereby enclose the open rear of the frame 510. The mats 700 are provided to keep agitated sediment within the interior of the frame 510 in order that it be extracted by the openings 670 of the extractor. However, if too much sediment is contained within the frame 510, such that pressure builds within the frame to a certain point, or if an object such as a container lashing or other heavy item of debris enters the frame 510 it will be sufficient to deform the mats 700 away from the frame 510 such that the excess sediment or debris can be ejected out of the back of the frame 510.

The dredging apparatus 500 is attached to a vehicle with a series of cables. Four cables generally indicated 710 are connected to connectors on the frame 510 about the extractor pump and coalesce to a single cable (not shown) which is connected to a winch at the rear of the vehicle (also not shown). This cable 710 is used to raise and lower the dredging apparatus during use and to set its depth in the water. Further cables 720 are provided at the front of the dredging apparatus 500 and are connected to the front of opposed side walls 520. The cables 720 extend beneath the vehicle and are attached at the front of the vehicle. These cables are provided to maintain the stability of the frame 510 during use and to maintain it at the correct depth. If the cables 720 at the front are not provided, then the dredging apparatus 500 may rise in the water once it has encountered some sediment.

The cables 710 may also be connected to a swell compensator disposed on the vehicle, the swell compensator maintaining the dredging apparatus at the same level above the waterbed during use.

The extractor and injector pumps 650, 570 are in this embodiment powered by electricity supplied from the vehicle, which is provided via umbilical generally indicated 730 which comprises a series of wires extending towards a power source on the vehicle. The injector and extractor pumps 570, 650 will generally be electrically powered. However, in some embodiments they may be hydraulic and, in which case, the umbilical 730 would also comprise hydraulic pipe or pipes leading up to the vehicle.

Figure 10:
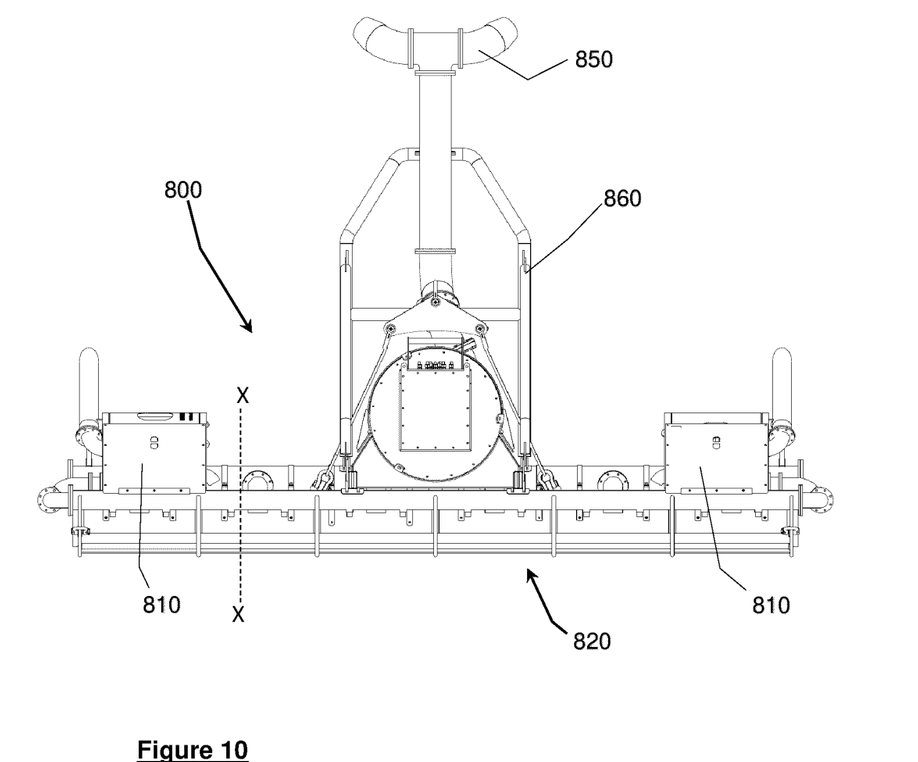
FIG. 10 shows a front view of a further example of dredging apparatus according to the present invention.
Figure 11:
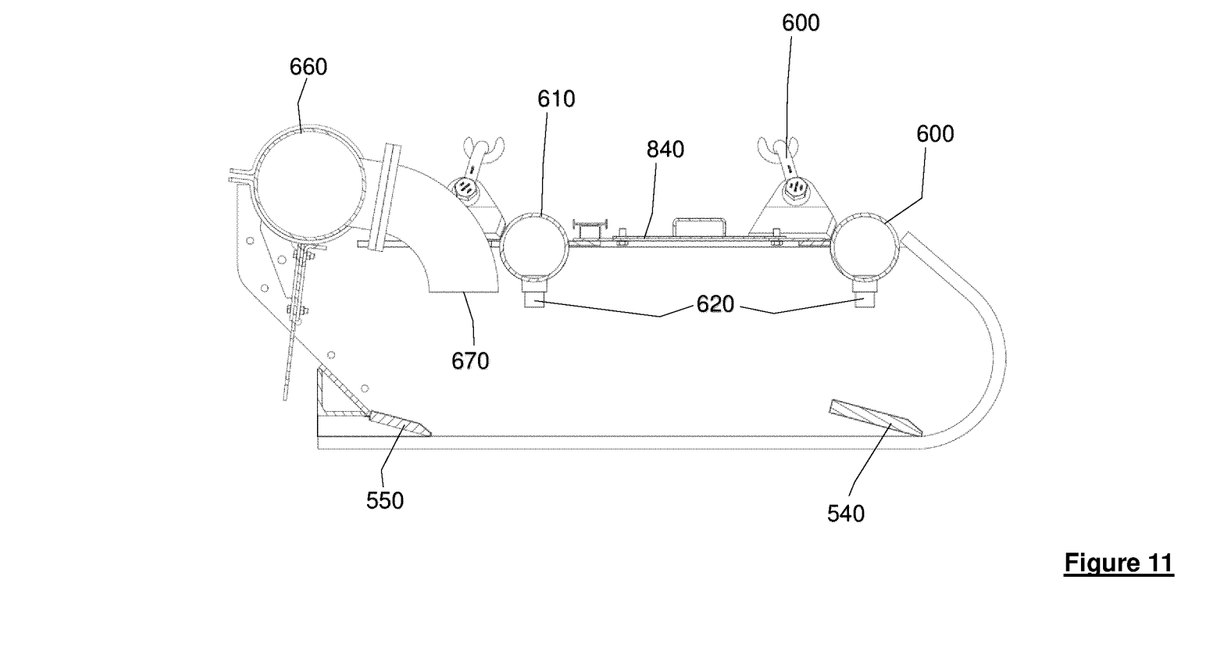
FIG. 11 shows a cross section view of the dredging apparatus of FIG. 10.
Figure 12:
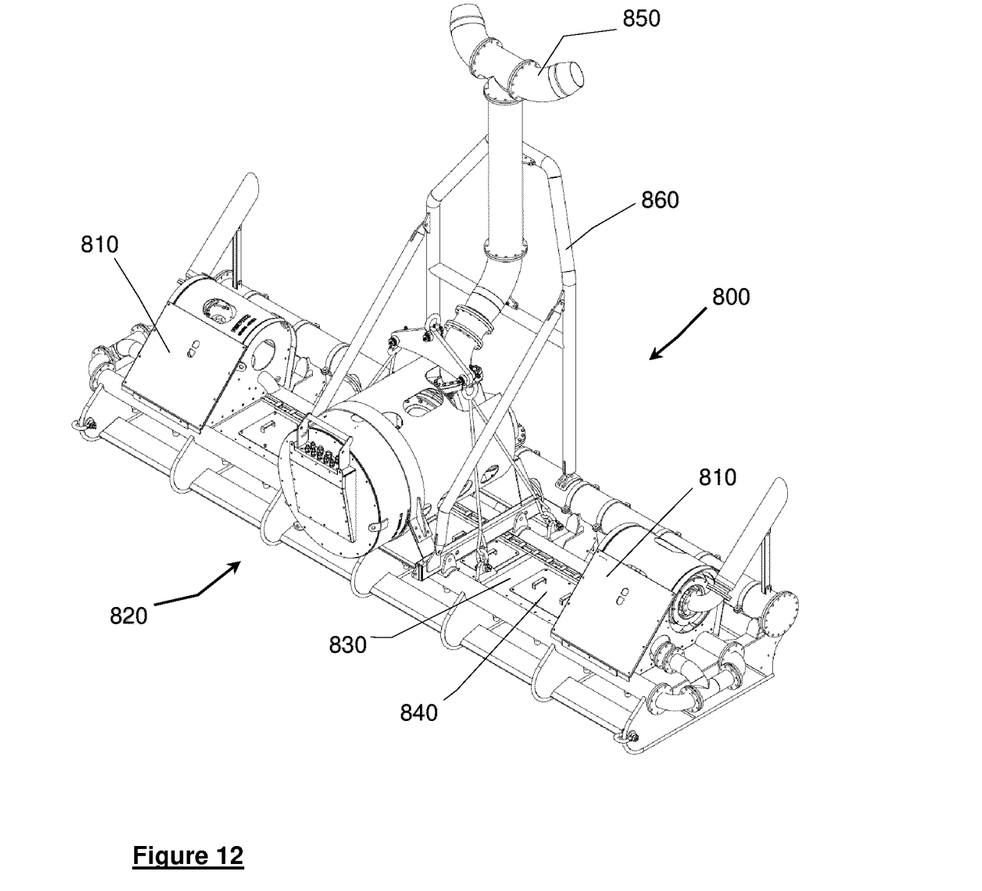
FIG. 12 shows a front, top perspective view of the dredging apparatus of FIGS. 10 and 11.

Turning now to FIGS. 10 to 12, there is shown an alternative embodiment of dredging apparatus, generally indicated 800 according to the present invention. Dredging apparatus 800 is a variation on dredging apparatus 500, and so like reference numerals are used where appropriate. Whereas dredging apparatus 500 was provided with a pilot in the form of grilles 690 to protect the pumps from debris, dredging apparatus 800 is instead provided with angled plates 810 mounted to the chassis 820. Plates 810 may be formed of metal or other rigid material, and are angled to deflect debris over the top of the dredging apparatus 800. In particular, during use the dredging apparatus 800 may encounter container lashings, which are rigid metal poles. The plates 810 will be able to deflect the lashings, even if they strike the plates 810 head-on.

The chassis 820 of dredging apparatus 800 is further provided with a top panel 830, which is provided with covered apertures 840 to permit access to beneath the top panel 830.

A further difference compared to the dredging apparatus 500, is that the extraction conduit 850 is bifurcated at the distal end thereof so that extracted sediment is discharged over a wider area in the water. Extraction conduit 850 is supported by frame 860.

FIG. 11 show a cross section view through line X-X as shown in FIG. 10. This view shows in cross section extractor pipe 660 having opening 670, and parallel pipes 600, 610 on the fluid outlet 590, which are in communication with nozzles 620. FIG. 11 also shows cross members 540, 550, which are angled from the horizontal and have tapered leading edges so as to cut and deflect any sediment that may be encountered during use.

The invention claimed is:

1. A method of dredging comprising:
 suspending dredging apparatus from a vehicle, the dredging apparatus comprising:
  a chassis;
  sediment agitating apparatus for disposal above a sediment layer on a waterbed, the sediment agitating apparatus comprising a fluid injector and a pump arranged to inject fluid through the fluid injector, the sediment agitating apparatus and pump being mounted directly on the chassis wherein the and injector comprises one or more conduit, the conduit bearing a plurality of nozzles;

separately an extractor, the extractor being arranged to move agitated sediment away from the waterbed and above the dredging apparatus, the extractor comprising a conduit and a pump arranged to pump agitated sediment through the conduit, the extractor and pump being mounted directly on the chassis; and a connector for connecting the sediment dredging apparatus to the vehicle;

disposing the dredging apparatus above, but not in contact with a waterbed to be dredged of sediment;

agitating the sediment with the sediment agitating apparatus;

extracting the sediment with the extractor;

suspending the extracted sediment underwater and into a higher water column above the sediment agitating apparatus; and moving the dredging apparatus around the water;

wherein the sediment is transported and deposited away from an area being dredged by the natural movement of the water.

2. A method as claimed in claim 1, wherein the fluid injector is provided on the underside of the sediment agitating apparatus.

3. A method as claimed in claim 1, wherein the conduit of the extractor has a first opening disposed towards the underside of the sediment dredging apparatus, and a second opening disposed at a highermost point on the sediment dredging apparatus.

4. A method as claimed in claim 3, wherein the conduit is frustoconical and wherein the second opening is wider than the first opening.

5. A method as claimed in claim 1, wherein the pumps are powered with a power supply provided on the vehicle.

6. A method as claimed in claim 1, wherein the pumps are powered with a power supply provided on the dredging apparatus.

7. A method as claimed in claim 1, wherein the dredging apparatus and/or the vehicle further comprises a pilot to deflect debris encountered on the waterbed.

8. A method as claimed in claim 1, wherein the vehicle further comprises a swell compensator, and wherein the swell compensator maintains the dredging apparatus at the same level above the waterbed.

9. A method as claimed in claim 1, wherein the chassis comprises shock absorbing means.

10. A method as claimed in claim 9, wherein the shock absorbing means comprises runners mounted on the underside of the chassis.

11. A method as claimed in claim 1, wherein the chassis comprises an open frame.

12. A method as claimed in claim 1 wherein the chassis comprises opposed side panels, and one or more body panel disposed in parallel between the side panels, the body panel and side panels being joined by one or more cross member.

13. A method as claimed in claim 12, wherein the sediment agitating apparatus comprises the one or more cross member, and wherein the cross member comprises one or more conduit comprising one or more outlet for injecting fluid, the sediment agitating apparatus being in communication with the one or more pump, which pump is in communication with an inlet, and wherein fluid in drawn in from the surrounding area.

14. A method as claimed in claim 12, wherein the extractor comprises the one or more cross member, wherein the one or more cross member comprises one or more conduit comprising inlets into which agitated sediment is drawn to be expelled, wherein the extractor is in communication with the one or more pump, wherein the pump is in communication with a conduit raised above the dredging apparatus to expel agitated sediment above the dredging apparatus in use.

15. Dredging apparatus for disposal above, but not in contact with, a waterbed to be dredged of sediment, the apparatus comprising:

a chassis;

sediment agitating apparatus for disposal above a sediment layer on a waterbed, the sediment agitating apparatus comprising a fluid injector and a pump arranged to inject fluid through the fluid injector, the sediment agitating apparatus and pump being mounted directly on the chassis, wherein the fluid injector, comprises one or more conduit, the conduit bearing a plurality of nozzles;

separately an extractor, the extractor being arranged to move agitated sediment away from the waterbed and above the dredging apparatus, the extractor comprising a conduit and a pump arranged to pump agitated sediment through the conduit and suspend the extracted sediment underwater and into a higher water column above the sediment agitating apparatus, the extractor and pump being mounted directly on the chassis; and a connector for connecting the sediment dredging apparatus to a vehicle.

16. Use of dredging apparatus as claimed in any of claim 15, wherein the use comprises:

connecting the dredging apparatus to a vehicle with the connector;

suspending the dredging apparatus above, but not in contact with a waterbed to be dredged;

extracting the agitated sediment with the extractor and suspending the extracted sediment underwater and above the extractor.

* * * * *